(12) United States Patent  
Griffin (10) Patent No.: US 7,504,967 B2  
(45) Date of Patent: Mar. 17, 2009

(54) PORTABLE ELECTRONIC DEVICE WITH KEYBOARD

(75) Inventor: Jason T. Griffin, Waterloo (CA)

(73) Assignee: Research In Motion Limited, Waterloo, Ontario ( * ) Notice: Subject to any disclaimer, the term of this patent is extended or adjusted under 35 U.S.C. 154(b) by 251 days.

(21) Appl. No.: 10/480,614

(22) PCT Filed: Jun. 10, 2002

(86) PCT No.: PCT/CA02/00862

§ 371 (c)(1),
(2), (4) Date: Dec. 11, 2003

(87) PCT Pub. No.: WO02/101531

PCT Pub. Date: Dec. 19, 2002

(65) Prior Publication Data

US 2004/0198249 A1    Oct. 7, 2004

(51) Int. Cl.
*H03M 11/00* (2006.01)
(52) U.S. Cl. .............. 341/22; 341/21; 341/23; 341/26; 341/34; 345/168; 345/169; 345/170; 345/172; 345/184; 455/550.1; 200/4; 200/5 A; 200/5 R; 200/6 A; 200/6 R
(58) Field of Classification Search .......... 341/22, 341/23, 21, 26, 34; 455/550.1, 90.3, 556.1, 455/566; 345/169, 184, 168, 170, 172; 200/4, 200/5 A, 5 R, 6 A, 6 R
See application file for complete search history.

(56) References Cited

U.S. PATENT DOCUMENTS

| 3,967,273 | A | | 6/1976 | Knowlton |
| 4,449,839 | A | * | 5/1984 | Bleuer ................. 400/485 |
| 4,769,516 | A | | 9/1988 | Allen |
| 5,017,030 | A | | 5/1991 | Crews |
| 5,486,058 | A | | 1/1996 | Allen |
| 5,528,235 | A | | 6/1996 | Lin et al. |
| 5,581,243 | A | * | 12/1996 | Ouellette et al. ........... 345/173 |
| 5,664,896 | A | | 9/1997 | Blumberg |
| 5,818,437 | A | * | 10/1998 | Grover et al. ............. 715/811 |
| 5,841,374 | A | | 11/1998 | Abraham |
| 5,953,541 | A | | 9/1999 | King et al. |

(Continued)

FOREIGN PATENT DOCUMENTS

CN        124833 A        3/2000

(Continued)

OTHER PUBLICATIONS

Anonymous: "Triangular Toggle Keys for Touch-Tone Phones," IBM Technical Disclosure Bulletin, vol. 31, No. 1, Jun. 1988, pp. 47-49, XP002215434 New York US.

*Primary Examiner*—Jeff Hofsass
*Assistant Examiner*—Sisay Yacob
(74) *Attorney, Agent, or Firm*—Novak Druce + Quigg LLP (57) ABSTRACT

A keyboard (32, 1230) for a handheld electronic device (100, 1100, 1200) comprising a row of keys (102) wherein each of said keys (102) represents at least two alphanumeric characters and the characters of each key (102) are positioned relative to the characters on adjacent keys (102) so as to form a QWERTY or DVORAK layout.

25 Claims, 8 Drawing Sheets

U.S. PATENT DOCUMENTS

| | | |
|---|---|---|
| 6,011,554 A | 1/2000 | King et al. |
| 6,103,979 A * | 8/2000 | Motoyama et al. ............. 200/4 |
| 6,121,960 A * | 9/2000 | Carroll et al. ............... 345/173 |
| 6,231,252 B1 | 5/2001 | Kitamura |
| 6,295,052 B1 | 9/2001 | Kato et al. |
| 6,333,734 B1 | 12/2001 | Rein |
| 6,356,258 B1 | 3/2002 | Kato et al. |
| 6,378,234 B1 | 4/2002 | Luo |
| 6,765,556 B2 | 7/2004 | Kandogan et al. |
| 6,882,859 B1 * | 4/2005 | Rao et al. ................ 455/550.1 |
| 2002/0027549 A1 | 3/2002 | Hirschberg |
| 2002/0041784 A1 * | 4/2002 | Thomas ...................... 400/472 |
| 2002/0151283 A1 * | 10/2002 | Pallakoff ..................... 455/90 |
| 2004/0067768 A1 * | 4/2004 | King et al. ............... 455/556.1 |
| 2004/0108994 A1 | 6/2004 | Kato |
| 2005/0054376 A1 | 3/2005 | Griffin et al. |

FOREIGN PATENT DOCUMENTS

| | | |
|---|---|---|
| EP | 0129996 A2 | 1/1985 |
| EP | 0538020 B1 | 4/1993 |
| JP | 58-102785 | 6/1983 |
| JP | 04-143821 | 5/1992 |
| JP | 08-211987 | 8/1998 |
| JP | 2000-035857 | 2/2000 |
| WO | 9833111 A1 | 7/1998 |
| WO | WO 98 33111 A1 | 7/1998 |
| WO | 0074240 A1 | 12/2000 |

\* cited by examiner

PORTABLE ELECTRONIC DEVICE WITH KEYBOARD

FIELD OF THE INVENTION

The present invention relates generally to the field of small handheld electronic devices such as wireless communications devices. More particularly, the present invention relates to keyboards for use in such devices.

BACKGROUND OF THE INVENTION

Existing keyboards or keypads for small handheld devices often use the standard 12-key telephone keypads (herein collectively referred to as keypads). Typing text using such keypads requires the user to input data in an unfamiliar manner. Other kinds of keyboards follow the standard Dvorak or, more commonly, the QWERTY keyboard models and are used in portable handheld devices such as the RIM 950 Wireless Handheld™. This kind of keyboard when adapted to handheld devices uses a plurality of small individual keys optimised for operation with the thumbs of the user. However, such a keyboard has considerably more keys than a keypad and the larger number of individual keys requires more space on a printed circuit board (PCB) than a keypad. Each key requires its own footprint and switch on the PCB. Because of the relatively small size of such handheld devices, PCB space is limited and a QWERTY or Dvorak type keyboard takes up valuable real estate on the PCB.

Such a keyboard also requires a great deal of tooling in order to accommodate the large number of individual keys in the housing of a handheld device. This tooling adds to manufacturing costs.

It is, therefore, desirable to reduce the number of keys necessary for a QWERTY or Dvorak type keyboard layout used with small handheld devices.

SUMMARY OF THE INVENTION

It is an object of the present invention to obviate or mitigate at least one disadvantage of existing keyboards or keypads used with handheld electronic devices.

In a first aspect of the present invention there is provided a keyboard for an electronic device. The keyboard has a plurality of alphanumeric keys, each alphanumeric key corresponding to a plurality of alphanumeric values, each key for providing an input signal corresponding to at least one of the corresponding alphanumeric values of the key, the plurality of keys arranged to provide a standard keyboard layout, as well as a non-alphanumeric key for providing an input signal corresponding to a command key value. The plurality of alphanumeric keys and the non-alphanumeric key provide input to a keystroke interpreter which maps the received inputs to a sequence of alphanumeric and command values.

In embodiments of the present invention the keyboard layout is either a conventional QWERTY layout or a conventional Dvorak layout. In other embodiments, the plurality of keys provides one input signal, each of the keys has a single protruberance from an underside of said key which is adapted to engage a switching element located upon a printed circuit board underlying said keyboard and the keystroke interpreter employs predictive text routines for mapping the received inputs to a sequence of alphanumeric and command values. In another embodiment each key of the plurality of keys provides a plurality of distinct input signals that correspond to one of the alphanumeric values of the key which has plural protruberances from an underside of said key which are adapted to engage corresponding switching elements located upon a printed circuit board underlying said keyboard and the keystroke interpreter employs predictive text routines for mapping the received inputs to a sequence of alphanumeric and command values In another embodiment the keys are arranged as a row that extends along a horizontal reference line through the handheld electronic device and said keys are of elongated shape with their longitudinal axes parallel to or tilted from a vertical reference line through the handheld electronic device, where a first group of keys is located on one side of said vertical reference line and a second group is located on an opposite side of said vertical reference line, said first group being tilted at a positive angle with respect to said vertical reference line and said second group being tilted at a corresponding negative angle with respect to said vertical reference line.

In a further embodiment the keys are arranged as a row that extends along a vertical reference line through the handheld electronic device and said keys are of elongated shape with their longitudinal axes parallel to or tilted from a horizontal reference line through the handheld electronic device, wherein a first group of keys is located on one side of said horizontal reference line and a second group of keys is located on an opposite side of said horizontal reference line, said first group being tilted at a positive angle with respect to said horizontal reference line and said second group being tilted at a corresponding negative angle with respect to said horizontal reference line. In a presently preferred embodiment the keys are angled between about 20 degrees and about 70 degrees from vertical. In yet another embodiment the non-alphanumeric key corresponds to one of the group consisting of an ALT key, a SYMBOL key, a SPACE key, a RETURN key, a BACKSPACE key and a SHIFT key.

In a second aspect of the present invention there is provided a handheld electronic device that has a keyboard, a microprocessor and a software application. The keyboard has a plurality of alphanumeric keys, each alphanumeric key corresponding to a plurality of alphanumeric values, each key for providing an input signal corresponding to at least one of the corresponding alphanumeric values of the key, the plurality of keys arranged to provide a standard keyboard layout, a non-alphanumeric key for providing an input signal corresponding to a command key value, and a keystroke interpreter for receiving the input signals from the plurality of alphanumeric keys and from the non-alphanumeric key and for mapping the received inputs to a sequence of alphanumeric and command values. The microprocessor is operatively connected to the keyboard for receiving the sequence of alphanumeric and command values, and controls the operation of the device. The software application is executable by the microprocessor, and provides a plurality of operational features and initiating such features upon certain inputs from the keyboard. In a presently preferred embodiment of this aspect the handheld electronic device further includes a display. In another embodiment the keyboard interpreter of the keyboard employs predictive text routines for mapping the received inputs to a sequence of alphanumeric and command values.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 2 comprises:

DETAILED DESCRIPTION

Figure 1:
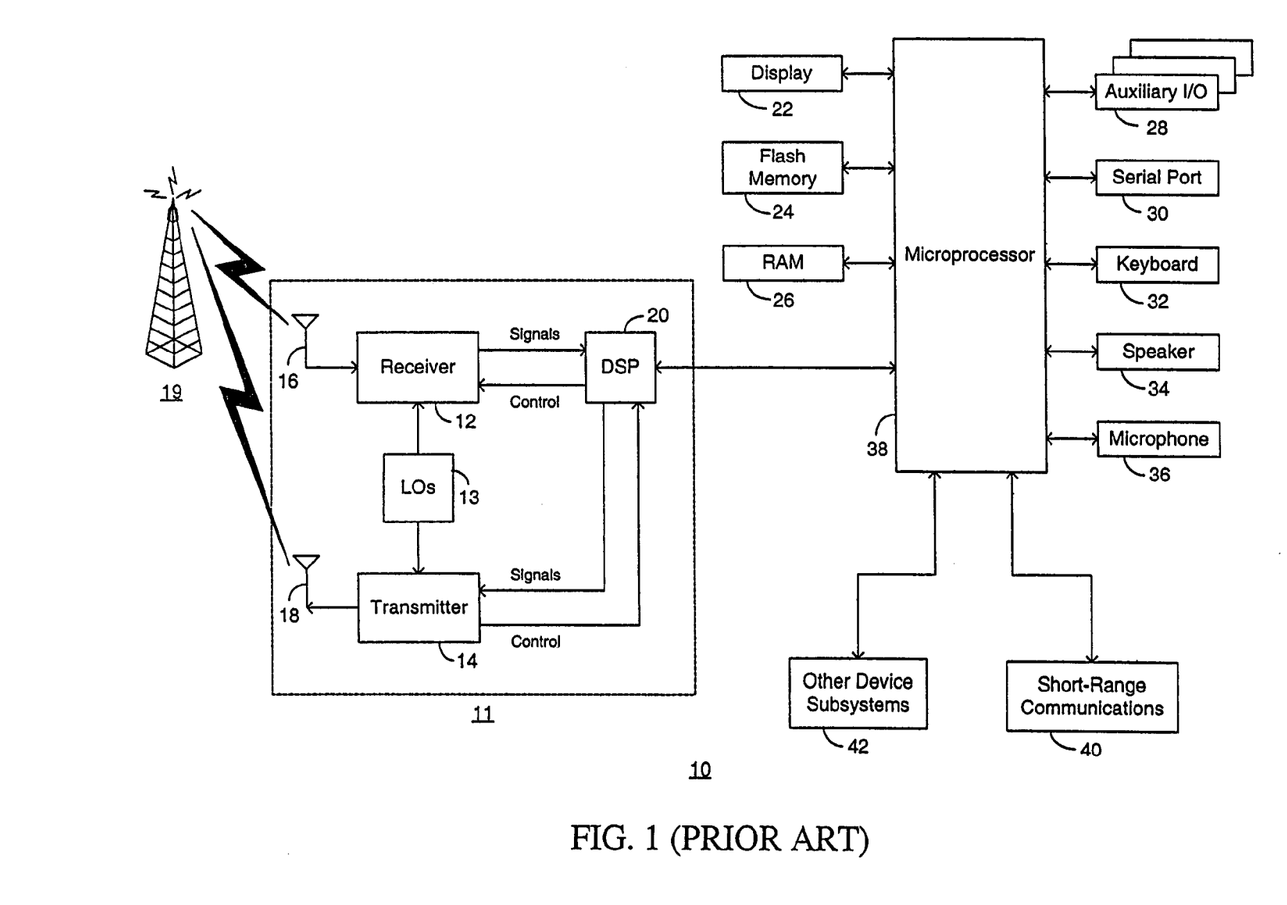
FIG. 1 is a block diagram of a mobile communication device to which the present invention may be applied.

Referring now to the drawings, FIG. 1 is a block diagram of a mobile communication device 10 in which the present invention may be implemented. The mobile communication device 10 is preferably a two-way communication device having at least voice and data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

Where the device 10 is enabled for two-way communications, the device will incorporate a communication subsystem 11, including a receiver 12, a transmitter 14, and associated components such as one or more, preferably embedded or internal, antenna elements 16 and 18, local oscillators (LOs) 13, and a processing module such as a digital signal processor (DSP) 20. As will be apparent to those skilled in the field of communications, the particular design of the communication subsystem 11 will be dependent upon the communication network in which the device is intended to operate. For example, a device 10 destined for a North American market may include a communication subsystem 11 designed to operate within the Mobitex™ mobile communication system or DataTACT™ mobile communication system, whereas a device 10 intended for use in Europe may incorporate a General Packet Radio Service (GPRS) communication subsystem 11.

Network access requirements will also vary depending upon the type of network 19. For example, in the Mobitex and DataTAC networks, mobile devices such as device 10 are registered on the network using a unique personal identification number or PIN associated with each device. In GPRS networks however, network access is associated with a subscriber or user of a device 10. A GPRS device therefore requires a subscriber identity module (not shown), commonly referred to as a SIM card, in order to operate on a GPRS network. Without a SIM card, a GPRS device will not be fully functional. Local or non-network communication functions (if any) may be operable, but the device 10 will be unable to carry out any functions involving communications over network 19. When required network registration or activation procedures have been completed, a device 10 may send and receive communication signals over the network 19. Signals received by the antenna 16 through a communication network 19 are input to the receiver 12, which may perform such common receiver functions as signal amplification, frequency down conversion, filtering, channel selection and the like, and in the example system shown in FIG. 1, analog to digital conversion. Analog to digital conversion of a received signal allows more complex communication functions such as demodulation and decoding to be performed in the DSP 20. In a similar manner, signals to be transmitted are processed, including modulation and encoding for example, by the DSP 20 and input to the transmitter 14 for digital to analog conversion, frequency up conversion, filtering, amplification and transmission over the communication network 19 via the antenna 18.

The DSP 20 not only processes communication signals, but also provides for receiver and transmitter control. For example, the gains applied to communication signals in the receiver 12 and transmitter 14 may be adaptively controlled through automatic gain control algorithms implemented in the DSP 20.

The device 10 preferably includes a microprocessor 38 that controls the overall operation of the device. Communication functions, including at least data and voice communications, are performed through the communication subsystem 11. The microprocessor 38 also interacts with further device subsystems such as the display 22, flash memory 24, random access memory (RAM) 26, auxiliary input/output (I/O) subsystems 28, serial port 30, keyboard 32, speaker 34, microphone 36, a short-range communications subsystem 40 and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Operating system software used by the microprocessor 38 is preferably stored in a persistent store such as flash memory 24, which may instead be a read only memory (ROM) or similar storage element (not shown). Those skilled in the art will appreciate that the operating system, specific device applications, or parts thereof, may be temporarily loaded into a volatile store such as RAM 26. It is contemplated that received communication signals may also be stored to RAM 26.

The microprocessor 38, in addition to its operating system functions, preferably enables execution of software applications on the device. A predetermined set of applications which control basic device operations, including at least data and voice communication applications for example, will normally be installed on the device 10 during manufacture. A preferred application that may be loaded onto the device may be a personal information manager (PIM) application having the ability to organize and manage data items relating to the device user such as, but not limited to e-mail, calendar events, voice mails, appointments, and task items. Naturally, one or more memory stores would be available on the device to facilitate storage of PIM data items on the device. Such PIM application would preferably have the ability to send and receive data items, via the wireless network. In a preferred embodiment, the PIM data items are seamlessly integrated, synchronized and updated, via the wireless network, with the device user's corresponding data items stored or associated with a host computer system thereby creating a mirrored host computer on the mobile device with respect to the data items at least. This would be especially advantageous in the case where the host computer system is the mobile device user's office computer system. Further applications may also be loaded onto the device 10 through the network 19, an auxiliary I/O subsystem 28, serial port 30, short-range communications subsystem 40 or any other suitable subsystem 42, and installed by a user in the RAM 26 or preferably a non-volatile store (not shown) for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which will preferably further process the received signal for output to the display 22, or alternatively to an auxiliary I/O device 28. A user of device 10 may also compose data items such as email messages for example, using the keyboard 32, which is preferably a complete alphanumeric keyboard or telephone-type keypad, in conjunction with the display 22 and possibly an auxiliary I/O device 28. Such composed items may then be transmitted over a communication network through the communication subsystem 11.

For voice communications, overall operation of the device 10 is substantially similar, except that received signals would preferably be output to a speaker 34 and signals for transmission would be generated by a microphone 36. Alternative voice or audio I/O subsystems such as a voice message recording subsystem may also be implemented on the device 10. Although voice or audio signal output is preferably accomplished primarily through the speaker 34, the display 22 may also be used to provide an indication of the identity of a calling party, the duration of a voice call, or other voice call related information for example.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads to the device 10 other than through a wireless communication network. The alternate download path may for example be used to load an encryption key onto the device through a direct and thus reliable and trusted connection to thereby enable secure device communication.

A short-range communications subsystem 40 is a further optional component which may provide for communication between the device 24 and different systems or devices, which need not necessarily be similar devices. For example, the subsystem 40 may include an infrared device and associated circuits and components or a Bluetooth™ communication module to provide for communication with similarly enabled systems and devices.

Figure 2:
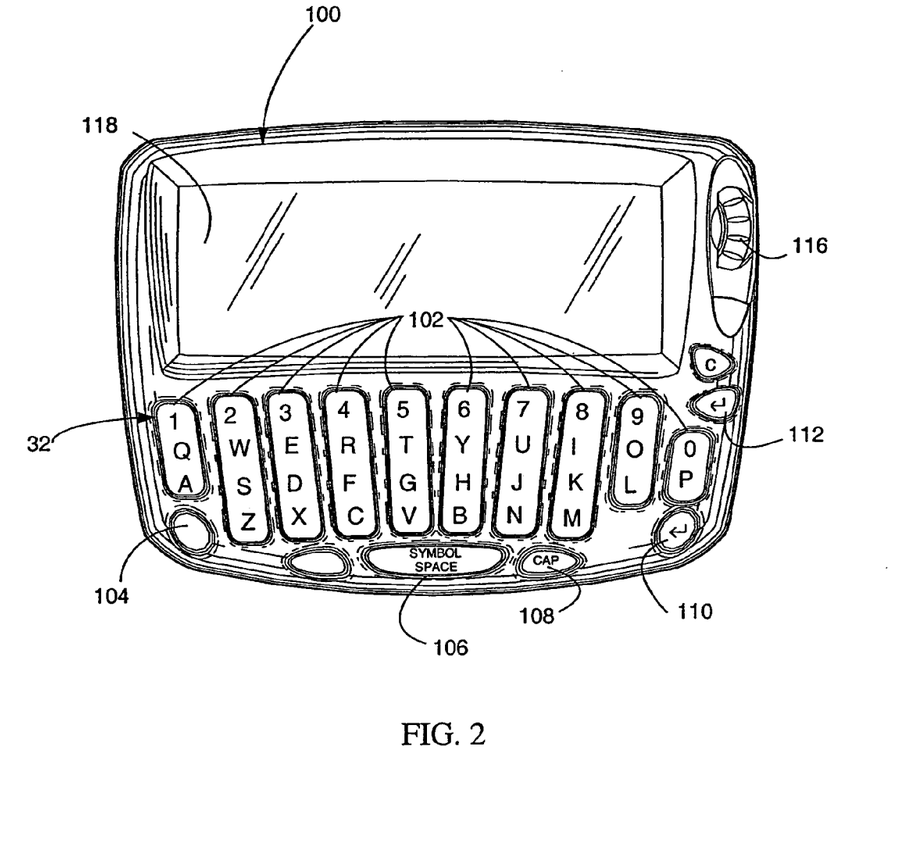
FIG. 2A is a plan view of a keyboard in accordance with one embodiment showing a user's thumb over a first key.
FIG. 2B is a plan view of a keyboard in accordance with one embodiment showing a user's thumb over a second key.
FIG. 2C is a plan view of a keyboard in accordance with one embodiment showing a user's thumb over a third key.
Figure 2A:
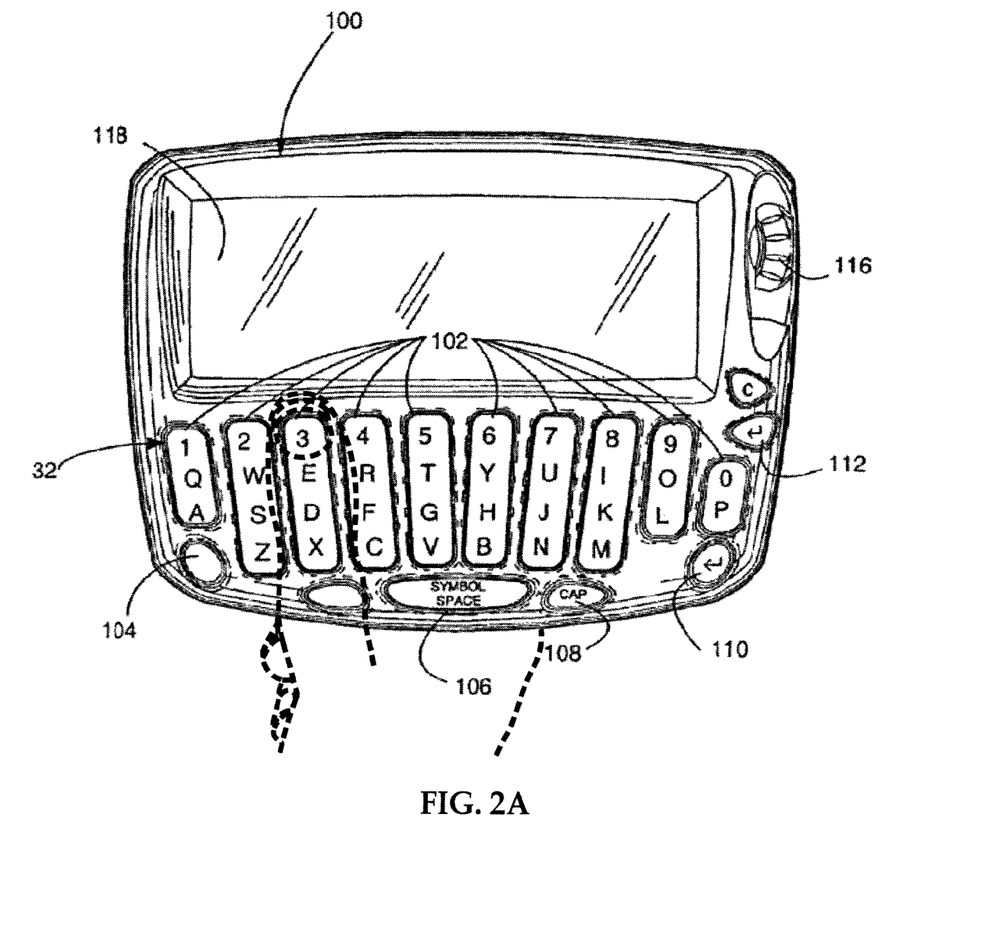
Figure 2B:
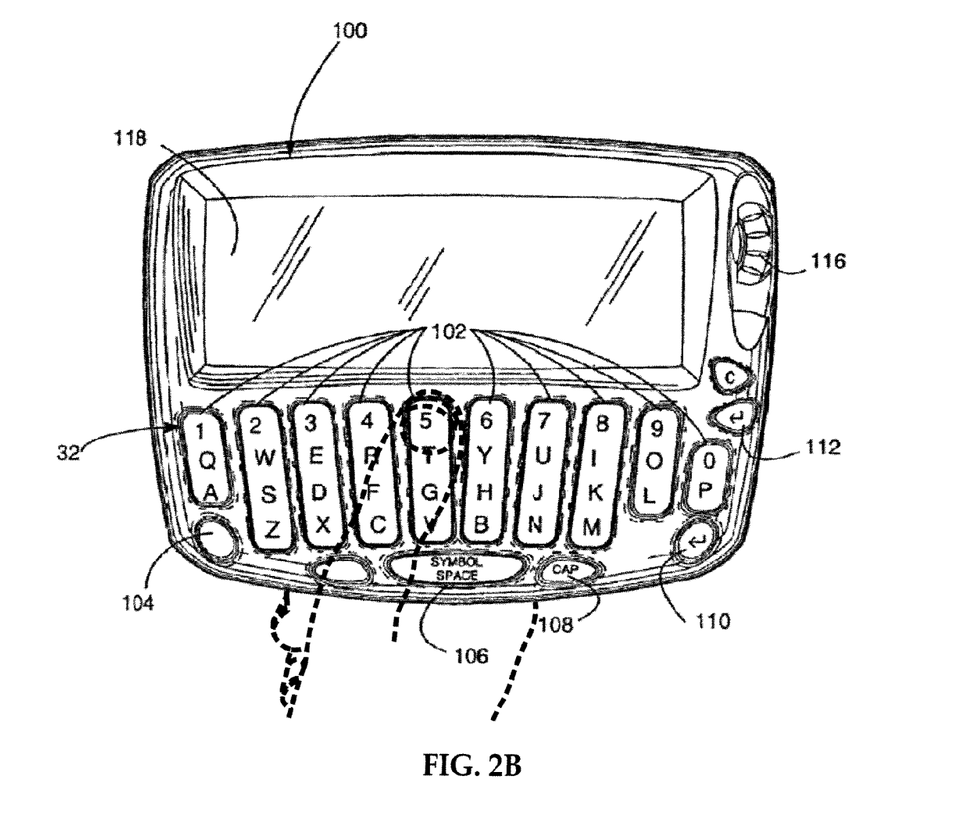
Figure 2C:
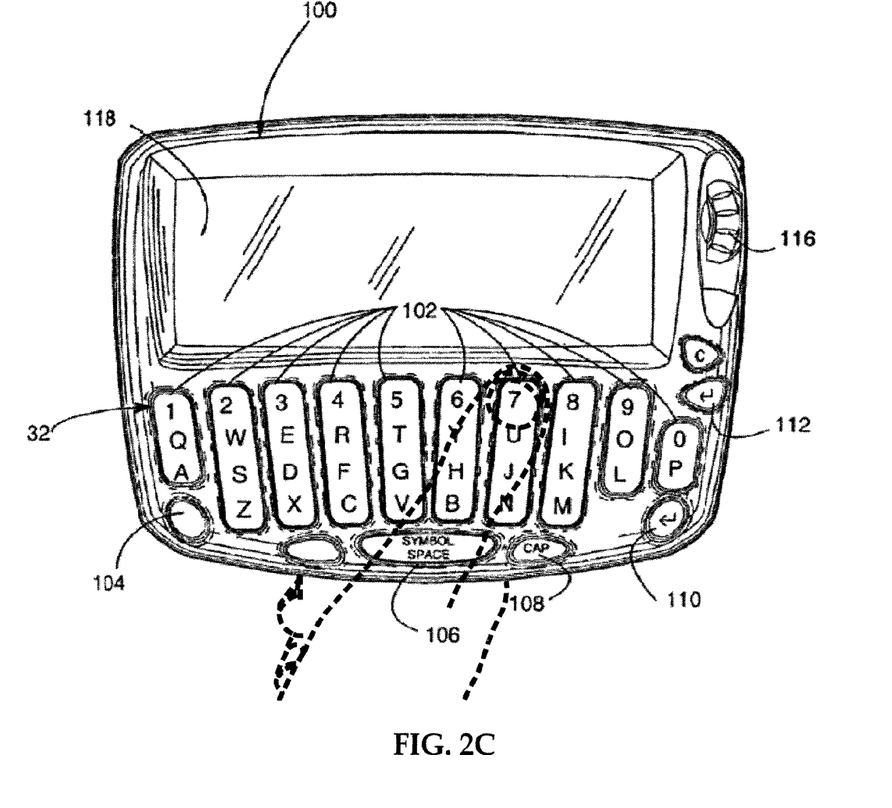

Thus, it will be apparent that handheld devices of this type perform a wide variety of complex functions and it is a challenge to provide a keyboard which is sufficiently compact to match the form factor of the handheld device but which provides the necessary level of functionality required by the user FIG. 2 is a plan view of a handheld device 100 incorporating a keyboard 32 of an embodiment of the present invention. In this embodiment, the keyboard consists of a horizontal array of ten adjacent elongated keys 102. Each key represents a plurality of alphanumeric characters. The alphanumeric characters are positioned on the keys such that the keyboard will have a standard QWERTY layout but if desired, the arrangement could be modified to form a standard Dvorak layout. Therefore, each key 102 represents a plurality of different alphanumeric character inputs depending on its position on the keyboard. For example, the key furthest to the left represents a text input of '1', 'Q' and 'A'. Although the example shown in FIG. 2 includes alphanumeric keys representing two to four different inputs, each key may represent more or fewer inputs that can include any combination of alphabetic and/or numeric symbols. The invention is in no way limited to the specific character assignments in FIG. 2.

In a presently preferred embodiment, the keys are at an angle relative to vertical. It has been found that having the keys at an angle relative to vertical eases typing with thumbs. Preferably the keys on the right side of the keyboard are rotated clockwise, while the keys on the left side of the keyboard are rotated counter-clockwise. Complementary angles ranging from 20 degrees to 70 degrees are preferably used.

The keyboard may also include other non-alphanumeric, or command, keys such as a symbol key 104. Such a key may access symbols or alternative functions when depressed in conjunction with the depression of another key or an auxiliary input. A SPACE key 106, RETURN key 110, and BACKSPACE key 112, may also be provided in similar relative positions to those of a typical QWERTY keyboard. A SHIFT key 108 may also be provided to access upper case letters when depressed in conjunction with alphanumeric inputs. Typical handheld devices will include a display 118, and possibly one or more auxiliary input devices, such as a thumbwheel 116.

This arrangement allows the user's thumbs more accuracy when depressing the keys than would be possible if each input were represented by an individual key, since individual keys would be have to be very small in order to fit the form factor of a compact handheld device. This arrangement is also less costly to produce than a keyboard where a single key represents each input since less tooling would be required for the housing of the handheld device and the mould for the keys would be less intricate.

Figure 3:
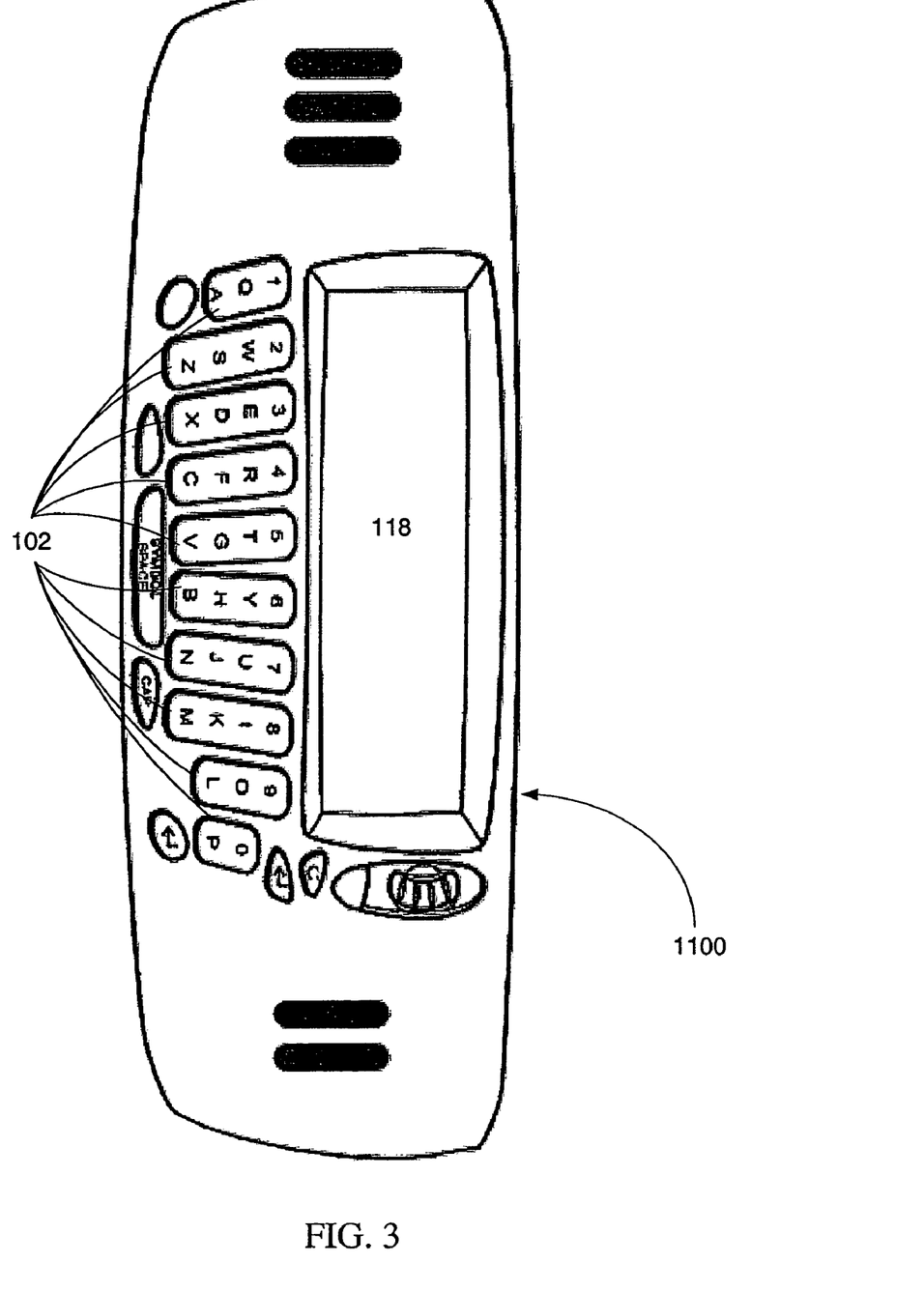
FIG. 3 is a plan view of a keyboard in accordance with a further embodiment of the invention, applied to a different type of handheld device.

FIG. 3 shows a similar keyboard in another kind of handheld device 1100, which has a different form factor than the device 100 and may for example be a cellular telephone. The keyboard is positioned alongside the display 118 and is particularly useful in this embodiment because the keys 102 are laid out in a natural order for the user to easily use.

Figure 4:
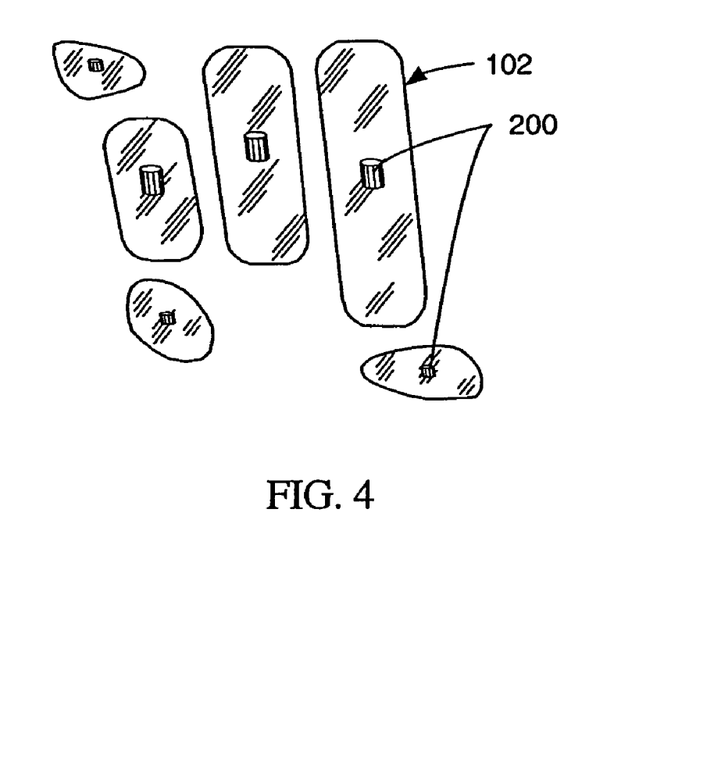
FIG. 4 is a plan view of a portion of the reverse side of the keyboard shown in FIGS. 2 and 3.

FIG. 4 is a plan view of the reverse side of a portion of a keyboard that would face the interior of a device in which the keyboard is implemented. As those skilled in the art will appreciate, such keyboards may be manufactured in a web form, such that the keyboard is effectively a single component, comprising a plurality of independently displaceable keys formed in substantially planar pliable base material. Each key 102 has a protuberance 200 on the reverse side. This protuberance comes into contact with a switch on a circuit board located within the handheld device when the key is depressed. In a presently preferred embodiment, one of the command keys serves as a number lock key. To enter a numeric value, the number lock key is depressed so that the keyboard intrepreter recognises the following key value as the corresponding numeric value of the key. In a further embodiment, the number keys are disjoint from the alphabetic keys, obviating the need to depress a number lock key, and still providing a non-ambiguous numeric input. In this embodiment, the alphabetic keys still correspond to a plurality of alphabetic values. The handheld device preferably uses some predictive text software application in order to deduce what the user is spelling. For example, if the user were to depress the left most key on the keyboard of FIGS. 2 and 3, the software would determine whether the user intends to enter a 'Q', or an 'A'. This may be initiated, for example, by appropriate inputs from the user through further keyboard or auxiliary inputs. Predictive text routines, as embodied in either Motorola iTaP™ or Tegic T9® Text input are known to the art, and either these, or other predictive text routines can be employed. Such predictive text applications tend to become more accurate and thus more useful with subsequent keystrokes, as the "root" term upon which a prediction is based increases in length. As such, it is contemplated that the predictive text application may be activated after a certain number of keystrokes have been made, such that a root term has a predetermined minimum length. Until that point is reached, the initial characters in the minimum length root term may be manually selected in various ways, for example by depressing a key multiple times, by holding a key in a depressed position, or by operating a further key or input while holding a key in a depressed position.

Predictive text routines are typically executed by a keystroke interpreter which receives signals generated by the depressing of either the alphanumeric or the non-alphanumeric keys. It should be noted that common digital cellular phone employ non-predictive text routines which could easily be adapted by one of skill in the art for use in the keystroke interpreter of the present invention.

Figure 5:
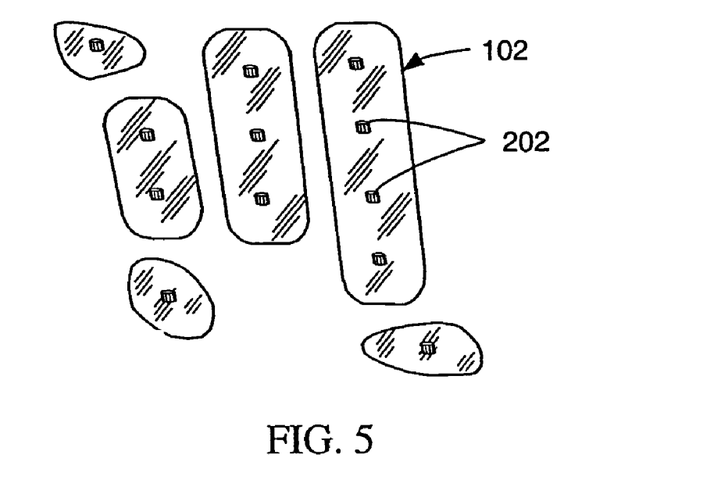
FIG. 5 is a plan view of a portion of the reverse side of another embodiment of the keyboard shown in FIGS. 2 and 3.

FIG. 5 illustrates another embodiment of a reverse side of the keyboard web. Each key 102 has a plurality of protuberances 202 which preferably match the location of each input character marked on the individual key on the topside of the keyboard web. For example, a protuberance 202 would be located under the '1' input on the leftmost key of the keyboard. That key would preferably also have a protuberance 202 under each of the 'Q' and 'A' inputs, totalling three protuberances on this particular key. Each protuberance 202 is associated with a switch on the related printed circuit board, such that when the user depresses the key in the location of the input character, that input will be entered as a text or numeric value. Predictive text software applications may also be implemented for this embodiment to predict what the user intends to enter, in case the user depresses a key in an incorrect location or more than one of the protuberances 202 makes contact with its associated switch on the PCB.

Figure 6:
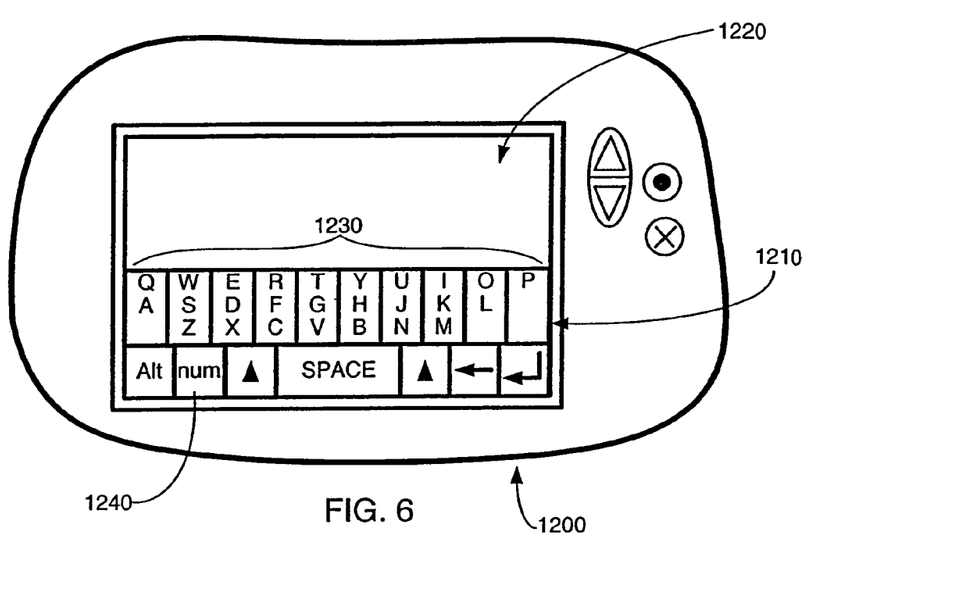
FIG. 6 is a plan view of a further embodiment of the handheld device that has a touch display with an alphabetic key arrangement.
Figure 7:
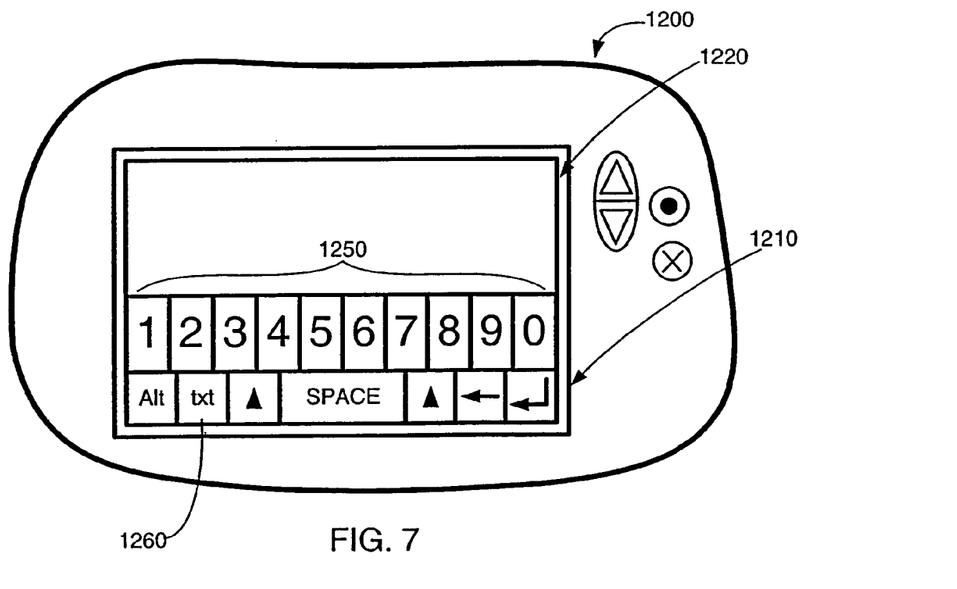
FIG. 7 is a plan view of the embodiment of FIG. 6 that has a touch display with a numeric key arrangement.

FIGS. 6 and 7 illustrate a further embodiment of the present invention. Handheld device 1200 has an electronic touch display 1210, which in a presently preferred embodiment is a touch sensitive liquid crystal display as is known to those of skill in the art. Display 1210 is divided into a virtual keyboard 1230, and a viewing area 1220. The alphanumeric keys of keyboard 1230, each have a plurality of alphanumeric values, and are arranged to provide a QWERTY keyboard layout, though a Dvorak layout can be implemented without departing from the scope of the present invention. Virtual keyboard 1230 has a soft 'num' key 1240, which toggles the displayed keyboard between an alphabetic keyboard and a numeric key arrangement 1250 of FIG. 7. The virtual keyboard of FIG. 8 has numeric keys 1250 and a soft 'txt' key 1260 which is used to toggle back to the alphabetic display of FIG. 6. In the embodiment of FIGS. 6 and 7, larger soft keys can be provided to the user than if individual keys were used, which is advantageous on a small device such as handheld 1200. In operation, the user touches the soft key that corresponds to the desired value. The touch screen generates an input signal corresponding to the touched key, and relays the signal to the keystroke interpreter, which optionally uses predictive text input routines to create an input stream provided to the rest of handheld 1200. As described earlier, it is possible to have each key generate a plurality of input signals depending upon the location at which contact with the key is made. With the virtual keyboard, it is possible to provide the keystroke interpreter with an input signal that has a probability of representing different values based on the location at which the key was depressed. These probability values can then be used by the predictive text routines to provide more accurate prediction of the text. It will be obvious to one of skill in the art that the arrangement of the command keys on display 1210 can be varied to provide different arrangement without departing from the scope of the present invention. It is foreseeable that another means of toggling between alphabetic and numeric entry could be implemented using another key arrangement.

The above-described embodiments of the present invention are intended to be examples only. Alterations, modifications and variations may be effected to the particular embodiments by those of skill in the art without departing from the scope of the invention, which is defined solely by the claims appended hereto.

I claim:

1. A handheld electronic wireless communication device comprising:
   a display located above a keyboard; and
   said keyboard comprising a row of a plurality of elongate alphanumeric keys, each elongate alphanumeric key having a plurality of associated alphanumeric values positioned one above the others and each elongate alphanumeric key being oriented so that a lengthwise axis of each key is substantially upright oriented;
   wherein the lengthwise axis of a plurality of alphanumeric keys located on a right side of a vertical centerline of the keyboard forms an angle with the vertical centerline and is rotated clockwise from the vertical centerline; and
   wherein the lengthwise axis of a plurality of alphanumeric keys located on a left side of the vertical centerline of the keyboard forms an angle with the vertical centerline and is rotated counterclockwise from the vertical centerline and whereby thumb actuation of each of said keys is facilitated during user operation of the handheld electronic wireless communication device.

2. The handheld electronic wireless communication device according to claim 1, wherein an angle of inclination of at least a plurality of said elongate keys is between about 20 degrees and about 70 degrees relative to vertical.

3. The handheld electronic wireless communication device according to claim 1, further comprising a microprocessor and software that performs predictive text routines on signals from actuated keys.

4. The handheld electronic wireless communication device according to claim 1, further comprising a keystroke interpreter operating on a microprocessor of said device.

5. The handheld electronic wireless communication device according to claim 1, wherein said keyboard has a width approximately equal to a width of said display.

6. The handheld electronic wireless communication device according to claim 1, wherein said keyboard has a width approximately equal to a width of said device.

7. The handheld electronic wireless communication device according to claim 1, further comprising an auxiliary input located above said keyboard.

8. The handheld electronic wireless communication device according to claim 1, further comprising a rotary auxiliary input located above said keyboard.

9. The handheld electronic wireless communication device according to claim 1, further comprising a rotary auxiliary input located horizontally adjacent to said display.

10. The handheld electronic wireless communication device according to claim 1, wherein said plurality of associated alphanumeric values comprise alphabetic characters arranged in a standard keyboard layout.

11. The handheld electronic wireless communication device according to claim 1, wherein said plurality of associated alphanumeric values comprise alphabetic characters arranged in a QWERTY keyboard layout.

12. The handheld electronic wireless communication device according to claim 1, wherein said plurality of associated alphanumeric values comprise alphabetic characters arranged in horizontal rows.

13. The handheld electronic wireless communication device according to claim 1, wherein at least a portion of said plurality of alphanumeric keys have at least three substantially vertically arranged alphabetic values associated therewith.

14. The handheld electronic wireless communication device according to claim 1, wherein the plurality of alphanumeric keys is provided by an electronic touch display.

15. The handheld electronic wireless communication device according to claim 14, wherein the electronic touch display is a touch sensitive liquid crystal display.

16. The handheld electronic wireless communication device according to claim 1, wherein each of said keys has a single protuberance from an underside of said key which is adapted to engage a switching element located upon a printed circuit board underlying said keyboard.

17. The handheld electronic wireless communication device according to claim 1, wherein said plurality of keys is arranged as a single row that extends parallel to a horizontal reference line through the device.

18. The handheld electronic wireless communication device according to claim 1, wherein said keyboard further comprises an elongate SPACE key positioned below said plurality of vertically elongate alphanumeric keys.

19. The handheld electronic wireless communication device according to claim 1, wherein said keyboard further comprises a RETURN key positioned in a lower right-hand corner of said keyboard.

20. A keyboard for a handheld electronic wireless communication device, said keyboard comprising a row of a plurality of elongate alphanumeric keys, each elongate alphanumeric key having a plurality of associated alphanumeric values positioned one above the others and each elongate alphanumeric key being oriented so that a lengthwise axis of each key is substantially upright oriented;
   wherein the lengthwise axis of a plurality of alphanumeric keys located on a right side of a vertical centerline of the keyboard forms an angle with the vertical centerline and is rotated clockwise from the vertical centerline; and
   wherein the lengthwise axis of a plurality of alphanumeric keys located on a left side of the vertical centerline of the keyboard forms an angle with the vertical centerline and is rotated counterclockwise from the vertical centerline and whereby thumb actuation of each of said keys is facilitated during user operation of the handheld electronic wireless communication device.

21. The keyboard according to claim 20, wherein an angle of inclination of at least a plurality of said elongate keys is between about 20 degrees and about 70 degrees relative to vertical.

22. The keyboard according to claim 20, wherein said plurality of associated alphanumeric values comprise alphabetic characters arranged in a QWERTY keyboard layout.

23. The keyboard according to claim 20, wherein said plurality of associated alphanumeric values comprise alphabetic characters arranged in horizontal rows.

24. The keyboard according to claim 20, wherein at least a portion of said plurality of alphanumeric keys have at least three substantially vertically arranged alphabetic values associated therewith.

25. The keyboard according to claim 20, wherein said keyboard further comprises an elongate SPACE key positioned below said plurality of vertically elongate alphanumeric keys and a RETURN key positioned in a lower right-hand corner of said keyboard.

* * * * *